United States Patent [19]
Poland

[11] 3,828,860
[45] Aug. 13, 1974

[54] AGRICULTURAL IMPLEMENT WITH FOLDABLE WINGS

[75] Inventor: Robert L. Poland, Kewanee, Ill.

[73] Assignee: Kewanne Machinery & Conveyor Co., A Division of Chromalloy American Corporation, Kewannee, Ill.

[22] Filed: Feb. 28, 1973

[21] Appl. No.: 336,897

[52] U.S. Cl. ................. 172/311, 172/456, 172/668
[51] Int. Cl. ............................................. A01b 49/00
[58] Field of Search .......... 172/311, 456, 660, 613, 172/619, 620, 635, 398, 423, 452, 459, 488, 614, 491, 668, 614; 16/145–147; 280/411–413

[56] References Cited
UNITED STATES PATENTS

| | | | |
|---|---|---|---|
| 2,828,680 | 4/1958 | Johnson | 172/456 X |
| 3,260,315 | 7/1966 | Day | 172/643 X |
| 3,327,787 | 6/1967 | Adee | 172/456 X |
| 3,390,727 | 7/1968 | Weaver et al. | 172/456 X |
| 3,559,746 | 2/1971 | Couser | 172/456 X |
| 3,650,333 | 3/1972 | Fueslein | 172/456 X |
| 3,692,121 | 9/1972 | Kenney | 172/456 |
| 3,714,992 | 2/1973 | Meier | 172/175 |
| 3,731,747 | 5/1973 | Frank | 172/456 X |

Primary Examiner—Robert E. Pulfrey
Assistant Examiner—R. T. Rader
Attorney, Agent, or Firm—Johnson, Dienner, Emrich, Verbeck & Wagner

[57] ABSTRACT

An agricultural implement is disclosed having a center frame and wings hinged to either side thereof on which are supported soil working tools. First remotely controlled hydraulic means actuate links which swing the wings between stable horizontal "transport" positions at rest on the center frame and horizontal "field working" positions to opposite sides of said frame. The links hold the wings against movement when in their "transporting" position and allow the wings freedom to swing when in their "field working" position to follow the contour of the field over which the implement is moved. Further hydraulic means operate other linkages which include screw-threaded swivel links on or by the axes about which the wings swing to interconnect the soil working tools and/or pivotally mounted wheels on the wings with those on the center frame so that the tools on the wings move into their working positions with corresponding movement of the tools on the center frame under the remotely controlled operation of the further hydraulic means.

15 Claims, 15 Drawing Figures

AGRICULTURAL IMPLEMENT WITH FOLDABLE WINGS

This invention relates to agricultural implements such as tractor-drawn mulchers, disks, tillers, cultivators, harrows and the like having gangs of soil working tools arranged both on a center frame and on laterally disposed wings which are hinged to the sides of the center frame, the wings being foldable over the frame in order to reduce the implement width as when moving between fields and foldable out therefrom to increase the working width of the implement as in disking, mulching, harrowing or tilling a field.

A principal object of this invention is to provide means which will permit the wings of such an implement to be conveniently and safely swung between a horizontal transport position over the center frame of the implement and horizontal working positions outwardly of the center frame.

A companion object of the invention is to provide means by which the level of the soil working tools on the wings is automatically set as the tools on the implement main frame are set at their operating level.

A further object of the invention is to provide such means which may be conveniently and safely operated at a distance clear of the swing of the wings as from the safety of the farmer's seat in the cab of the tractor to which the implement is hitched.

Agricultural implements having wings which may be folded from a horizontal working position on either side of a center frame to a horizontal position over the center frame in order to reduce the overall width of the implement for travelling or storage are not new. However, in the past, the raising and lowering of the wings has usually been accomplished manually, and because the wings are heavy and the disks, teeth or other tools they carry have sharp cutting edges it has been customary to provide lift-assist or counter balancing springs to aid the farmer as he manually attempts to swing the wings from one of their two positions to the other. Even so, there is a considerable hazard and the operation must be performed with extreme care. Also, there is always the problem of a folded wing accidentally swinging open during transit of the implement and various latches have been devised to clamp or secure the folded wings to the frame when in their storage position as well as to lock the wings when in their extended or working positions to either side of the main center frame of the implement.

In accordance with this invention a novel articulated linkage is employed for hingedly connecting each wing to a side of the center frame to swing about a horizontal hinge axis located intermediate the two horizontal positions of the wing and the linkage is connected to a hydraulic ram mounted on the cylinder frame below said hinge axis, the arrangement being such that the force of the hydraulic ram when actuated is first utilized to pull or lift the wing out of either of its horizontal positions until the center of gravity of the wing has passed over the hinge axis at which moment the force of the ram then becomes effective to resist the fall of the wing, and the lowering of the wing to its other horizontal position remains under the control of the ram.

A feature of the invention is that operation of the hydraulic ram is required only to swing the wings about their hinge axes from their horizontal at rest positions on the center frame of the implement to their extended working positions at the sides of said fram or in reverse. In the at rest position of the wings on the center frame of the implement the said articulate linkage has its arms and pivotal connections so related to each other and to the hinge axis as to resist pivotal movement about the hinge axis, the articulate linkage serving to lock the wings in a stable position wherefor no latching bolts or pins are required. At the same time when the wings are located in their horizontal extended working position outwardly from the center frame the linkage affords no resistance to the wings which are allowed freedom to float upwardly or downwardly to follow the field contour during the mulching, disking or other tilling operation for which the implement is intended.

A further feature of the invention is the novel further linkages which include a screw threaded swivel link on or by the axis about which the wings swing on their hinges, said further linkages interconnecting the soil working tools in one form of the invention with soil working tools on the center frame such that the tools on the wings move in conjunction with the tools on the center frame into a required working position under the remotely controlled operation of further hydraulic means also mounted on the center frame of the implement. In a second form of the invention where the tools occupy fixed positions on the wings and center frame, the working depth of the tools is regulated by the angle at which the supporting wheels are tilted on their pivot shaft. In this form said further linkages serve to connect the wheel pivot shafts of the wings and center frame so that a tilting of the center frame supporting wheels on its pivot shaft similarly tilts the supporting wheels of the wings. Thus in both forms of the invnetion, the further hydraulic means is effective to set the tools on the center frame and wings at the required working depth but do not interfere with the swing of the wings between their transport positions at rest on the center frame and their extended working positions outwardly to the sides of the center frame.

A further feature of the invention, therefore, is that both the raising and lowering of the wings and the setting of the depth of the working tools across the full width of the implement can be controlled and operated by the farmer from the safety of his seat in the tractor cab to which the implement is hitched. Once the implement is hitched to the tractor and its hydraulic rams connected into the tractor hydraulic system the implement is ready for the disking, mulching or tilling operation without further adjustment or setting up. In his operation of the wings, there is no danger to the operator by reason of his proximity to the sharp cutting edges of the soil working tools as is the case where he was required to manually lift or lower the wings. Neither does the operator have to remove himself from the cab to set safety latches or remove them since the implement can be safely transported with its wings folded over and at rest on the main or center frame. Furthermore, in the down or field-working position of the wings they are not held rigid by the hydraulic system nor do they have to be set at any particular angle to accommodate field contour. The wings are free to follow the contour of the soil so that on one side they can be inclined upward and on the other side downward, all at the same time and automatically without the attention of the farmer.

Further features of the invention include simplicity of construction as well as of operation and construction which avoids damaging forces and/or build-up force in hydraulic ram cylinders with possible damage to the hoses and other portions of the hydraulic system.

Many other objects, advantages and features will be apparent or will become so upon consideration of the preferred embodiments of the invention which now will be described in connection with the accompanying drawings.

Figures 1, 2, 3, 4:
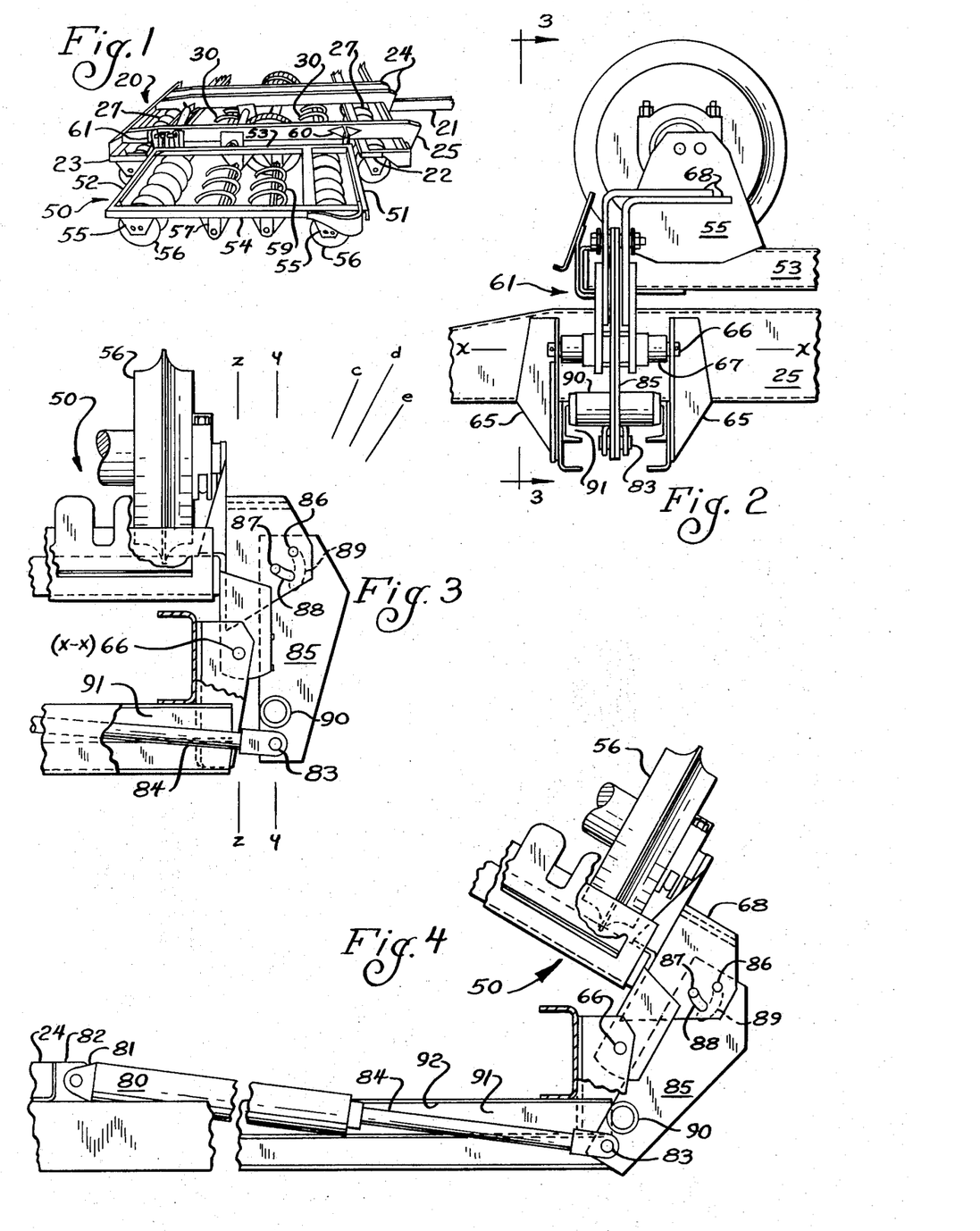
FIG. 1 illustrates a mulcher in which the present invention is embodied, one side of its center frame being fragmented and one of its two foldable wings being omitted as unnecessary to an understanding of the invention as it is later specifically described.
FIG. 2 is a fragmented view taken from one side of the implement and illustrates the hydraulic ram actuated articulate linkage by which the wings are hingedly connected to the main or center frame of the implement, the wing being illustrated in its transport or storage position on the center frame of the implement.
FIG. 3 is a view taken along line 3—3 of FIG. 2 looking in the directions indicated by the arrows and further illustrates the construction of said articulate hinge linkage.
FIG. 4 is a fragmented view generally similar to FIG. 3 but shows the wing partially raised out of its stable transport position on the implement main frame.

Referring now more particularly to the several views wherein like parts are identified by like reference numerals and first to FIGS. 1–10, a first form of the invention is illustrated embodied in an agricultural implement known in the art as a mulcher. The mulcher illustrated in FIG. 1 embodies a main frame 20 to the opposed sides of which are hinged a pair of wings 50 (only one of which is shown). Its main frame 20 and wings 50 as afterwards described support gangs of mulcher rollers 27 and spring teeth 30 which extend into the soil when the center frame 20 is lowered from its raised transport position so as to work and mulch the soil as in preparing the field for seed planting. As illustrated in FIG. 1, the main or center frame 20 of the implement is provided with a conventional hitch bar 21 by which it is attached behind a tractor not shown. Frame 20 comprises front and rear laterally extending box frame assemblies 22,23 interconnected by a pair of spaced longitudinally extending center channel members 24 and side channel members 25 which overlie the box frame assemblies to either side of the center channel members, the channel members being bolted or welded to the box frame assemblies so as to form a unitized rigid strong structure. Rigidly fixed to the ends of said front and rear box frame assembles 22,23 adjacent the four corners of the center frame 20 are hangers 26 (FIG. 10) providing rotatable bearing support for front and rear laterally extending gangs of roller wheels 27. Rigidly fixed to said longitudinally extending center and side channel members 24,25 between the front and rear box frame assemblies 22,23 (FIG. 1) are spaced pairs of aligned hangers 28 on which a pair of parallel spaced tooth bars 29 carrying spring teeth 30 are rotatably mounted. Between said aligned hangers 28, said side channel members 25 (FIG. 10) and center channel members 24 (FIG. 7) rigidly support aligned bearings 31 in which are rotatably mounted a wheel pivot shaft 32 generally parallel to the teeth bars 29. Rigidly welded to said pivot shaft 32 are a pair of radial arms 33 to the ends of which the spindle hub assemblies 34 of rubber-tired wheels 35 are bolted. Considering now also FIGS. 7 and 8, centrally of the main frame in the space between center channels 24 are a pair of oppositely arranged hydraulic rams 36, each having its cylinder pivotally connected to a respective one of cross braces 37 and the clevis end of its reciprocal rod 38 pivotally connected to the outer end of a respective one of a pair of crank arms 39 also rigidly welded to pivot shaft 32. Hydraulic hoses (not shown) interconnect the ram cylinders and to a hydraulic system controlled from within the cab of a tractor to which the implement is hitched such that the rod 38 of both rams are extended or retracted so that the rams cooperate to rotate the pivot shaft 32. In accordance to the direction in which the pivot shaft 32 is turned by rams 36, wheels 35 may be rotated upwardly thereon close to the underside of the frame 20 as illustrated by phantom lines 35' in FIG. 8 which lowers the center frame 20 and allows the roller wheels 27 to engage the soil. Thereafter the wheels 35 may be rotated by shaft 32 in the opposite direction to assume the position illustrated by full lines 35 in FIG. 8 in which the frame and the gangs of roller wheels are again raised to their illustrated transport position.

Figure 8:
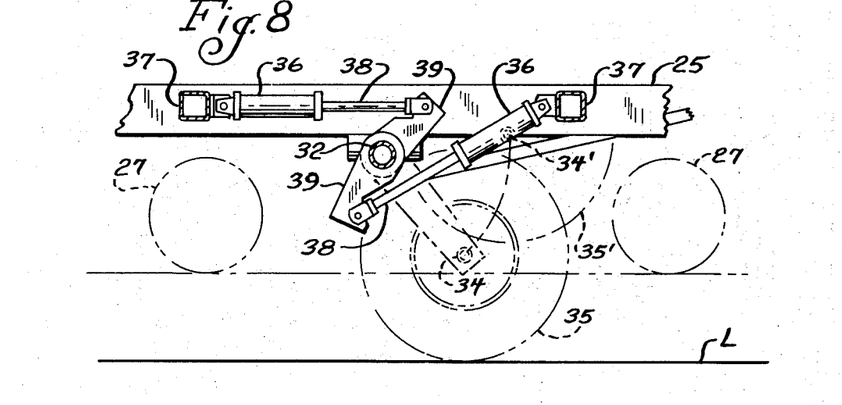
FIG. 8 is a view taken along lines 8—8 in said FIG. 7 and illustrates the connection of said hydraulic rams to the pivot shaft of the implement's transport wheels.
Figure 9:
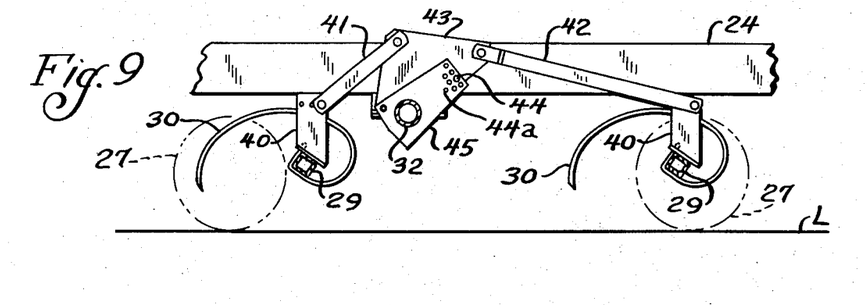
FIG. 9 is a sectional view taken along line 9—9 of FIG. 7 and illustrates linkage which is operated by rotation of the wheel pivot shaft to locate the spring teeth of the mulcher at their working level below that of the mulcher wheels when the transport wheels are raised.

Considering now FIG. 9 with FIG. 8, an upstanding arm 40 is shown bolted to each of the main frame front and rear tooth bars 29. To the outer ends of these said arms 40 is pivotally connected one end of respective links 41 and 42. Links 41 and 42 have their opposite ends pivotally connected to a first control plate 43. Said first control plate is assembled by means of a stop pin 44 to a second control plate 45 which is rigidly welded to the wheel pivot shaft 32. Therefore, as the wheel pivot shaft 32 is rotated in a counterclockwise direction to lower frame 20 and the mulching roller wheels 27 into their soil working position, the tooth bars 29 are simultaneously rotated causing their spring teeth 30 to move out of their illustrated retracted position and be set at a working level below the working level of the mulching rollers 27 identified in FIG. 9 at L. At this deeper level the spring teeth 30 are effective to penetrate the soil and raise clods and/or trash buried therein to a higher level where they can be worked by the mulching rollers 27. As illustrated in FIG. 9, the second control plate 45 is preferably provided with a number of holes 44a in any one of which stop pin 45 may be optionally inserted to differently set the operating depth of the spring teeth 30.

Referring again particularly to FIGS. 1 and 10, each of wings 50 comprises a front channel member 51, a rear channel member 52, an inner side channel member 53 and an outer channel member 54 which are bolted or welded together into a unitized rigid rectangular structure. The two side channels 53,54 have front and rear aligned hangers 55 which rotatably support gangs of mulching roller wheels 56 corresponding to mulching rollers 27 of the main frame 20. Side channel members 53,54 of the wings 50 also have aligned pairs of intermediate spaced hangers 57 which provide rotatable bearing support for the ends of tooth bars 58 carrying spring teeth 59 corresponding to the tooth bars 29 and spring teeth 30 of the main frame. As afterwards described, the tooth bars 58 of the wings are interconnected to the tooth bars 29 of the main frame by suitable linkage such that their spring teeth 59 retract and extend with the spring teeth 38 of the main frame.

It will be understood that the wing 50 (not shown) is similarly constructed and they both are similarly hinged to a respective one of the side channel members 25 of the main frame by spaced hinges 60 and 61 and operating linkage therefor which now will be described.

Figure 10:
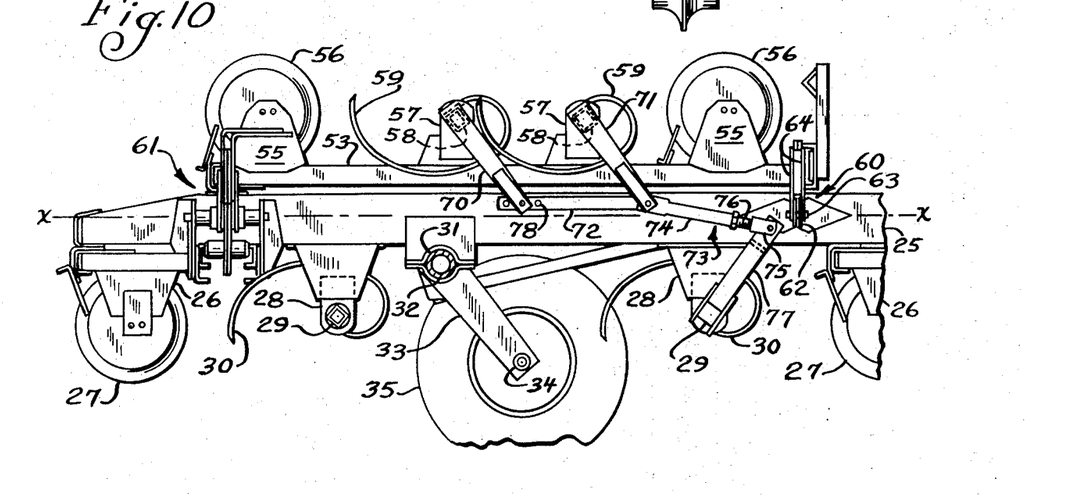
FIG. 10 is a side elevational view of the mulcher and illustrates further linkage which operatively connects the teeth supporting bars of the wings to a teeth supporting bar of the center frame so that the wing spring teeth are simultaneously extended and retracted with the spring teeth of the center frame.

As best illustrated in FIG. 10, forward hinge 60 comprises a pair of adjacent hinge ears 62 which are rigidly bolted to the outer wall of the main frame outer side channel member 25. Straddling said hinge ears are a pair of hinge plates 64 which are rigidly bolted or welded to the outer wall of the inner side channel member 53 of the wing frame. At 63 is a horizontally disposed first hinge pivot pin which connects hinge plate 64 to hinge ears 62.

Considering now also FIGS. 2 and 3 with FIG. 10, the rear hinges 61 comprise a pair of spaced hinge ears 65 rigidly welded or bolted to the outer wall of the main frame side channel member 25 and support a second hinge pivot pin 66 in alignment with the first hinge pivot pin 63 to define a hinge axis x—x. Rotatably mounted on the second hinge pin 66 is a pivot member 67 rigidly welded to the ends of spaced hinge plates 68 which in turn are rigidly welded to the other wall of the inner side channel 53 of the wing frame 50. For increased rigidity and strength, the upper ends of said hinge blades 68 are shown turned at right angles and wleded to each other and to the rear mulching wheel hanger 55.

Figure 7:
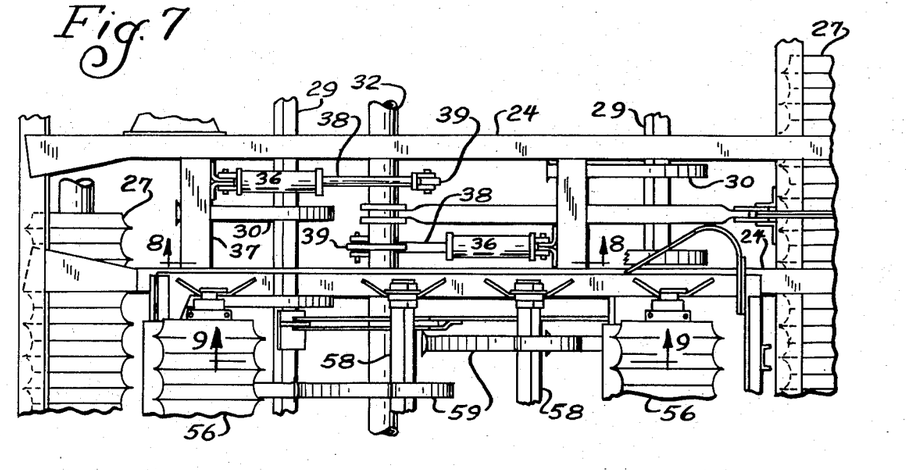
FIG. 7 is a fragmented top plan view of the central portion of the implement main frame and illustrates the hydraulic rams which raise the implement transport wheels and simultaneously lower the roller wheels of the mulcher into their soil working level.

As is apparent from FIG. 3, hinge axes x—x are not only disposed both horizontal and parallel to each other but are also located to outside the lateral extent of both the main frame 20 and wing frames 50. They are also spaced outside the general plane of the respective wings 50 such that when the wings are swung about said hinge axes x—x to assume a horizontal position over the main frame 20, the two wings 50 come to rest with their front and rear channel members 51, 52 on the nearest one of the main frame center channel member 24, their outer side channels 54 being in adjacent spaced relationship as illustrated by FIG. 7. In this at rest position of the wings 50 the wing hinge plates 68 assume a vertical position, this position as illustrated by FIG. 3. When the wings are swung through an angle of 180° about hinge axes x—x they also assume a horizontal field working position to either side of the main frame 20 in which horizontal position the wing mulching rollers 56 are at a level with the mulching rollers 27 of the main frame.

Considering now FIG. 10 with FIGS. 7, 8 and 9 an important feature of the invention is the linkage employed which permits the teeth bars 58 on each wing to be rotated with the rotation of the teeth bars 29 on the main frame as they respond to rotation of the wheel pivot shaft 32 so that the spring teeth 59 of the wings are simultaneously moved outwardly of their retracted position with the spring teeth 30 of the main frame to a previously determined working depth below the working level L of the mulching wheel gangs 27,56.

As shown in FIG. 10, such linkage comprises a first arm 70 non-rotatably fixed to the end of the rearward tooth bar 58 of the wing and a second arm 71 non-rotatably fixed to the end of the forward wing tooth bar 58, both arms 70,71 having their opposite ends pivotally pinned to a common connecting link 72 which is disposed at and generally parallel to hinge axis x—x. At 73 is a swivel link comprising a first portion 74 pivotally connected at one end to link 72 and a second portion 75 threadedly connected to said first portion by a screw thread connection indicated at 76. At 77 is a third arm which is immovably fixed at one end to the forward tooth bar 29 of the main frame and has its opposite end pivotally connected to portion 75 of the screw threaded swivel link 73. Rotary movement of the main frame tooth bar 29 is thus imparted through swivel link 73, connecting link 72 and arms 70,71 to the two wing teeth bars 58 by connecting link 72 to arm 70. Using a different one of the illustrated openings 78 it is possible to set the working depth of the forward and rearward spring teeth of the wings at different working depths. By threadedly adjusting the threaded connection 76 of the swivel link parts 74,75 the length of the swivel link 73 can be adjusted to accommodate adjustment of the rotary angle of the spring bar 58 in their hangers 57. It will be further appreciated that as the wings 50 are swung on hinges 60,61 about hinge axes x—x the articulation of the links and the proximity of the threaded connection 76 to axis x—x permits the parts 74,75 of the swivel link to turn on their threaded connections wherefore the linkage does not bind or interfere with the ability of the wings to swing.

Considering now FIGS. 2 through 6, an important feature of the invention is the novel hydraulic ram operating linkage means which is employed for remotely controlling raising and lowering of the wings 50 between their transport positions on the main frame 20 (FIG. 10) and their field working positions extended to either side of the main frame (FIG. 1). For this purpose wing elevating and lowering hydraulic rams 80 (FIG. 4) are located along the inner side of the rear box frame assembly 23 of the main frame, one operating ram for each wing. Each said ram has its cylindrical end 81 pivotally connected to a bracket 82 fixed to a respective one of the center channel members 24. The clevis end 83 of the reciprocating rod 84 of each ram is pivotally connected to one end of an operating link 85, the opposite end of said link being located between the aforementioned spaced hinge plates 68, 68. Said opposite end of the operating link 85 is pivotally connected to said hinge plates 68, 68 by a pair of horizontally spaced pivot pins 86 and 87 which are located in spaced parallel relation to hinge pivot pin 66 and hinge axes $x—x$ on which each wing 50 swings. As illustrated pivot pin 87, which is closest to the hinge pivot pin 66, is fixed to the operating link 85 and slides in aligned arcuate slots 88 in the hinge plates 68, 68 whereas pivot pin 86, which is rigidly mounted in hinge plates 68, 68, slides in arcuate slot 89 in link 85. As illustrated arcuate slots 88 and 89 face each other and each has its radius centered on the respective pin fixed to the other of said hinge plates and operating link 85. Thus arcuate slot 89 is centered on pin 87 and arcuate slot 88 and pin 86. Arcuate slot 89 also extends generally in a direction longitudinally of link 85. 90 represents a pair of projecting barrels or sliding pivotal elements rigidly fixed to the operating link 85 immediately above the pivotal connection 83 of the clevis end of the ram rod to the link, said pivotal elements 90 being centered on axis $y—y$ which also contains pivot pin 87 and said ram pivotal connection 83. Said pivotal elements 90 are so aligned with the entrance to guide cylinder 91 (compare FIGS. 2 and 4) that with retraction of rod 84 into the cylinder of the hydraulic ram 80 said elements enter the guide 91 and serve both to take the weight of the wing 50 off the ram during its operation of link 85 as afterwards described and also confines the push-pull force of the ram 80 along a horizontal path which is at right angles to the vertical plane represented by $z—z$ in FIG. 3 which includes hinge axis $x—x$ as defined by pivot pins 63 and 66 of the two hinges.

Figures 5, 6:
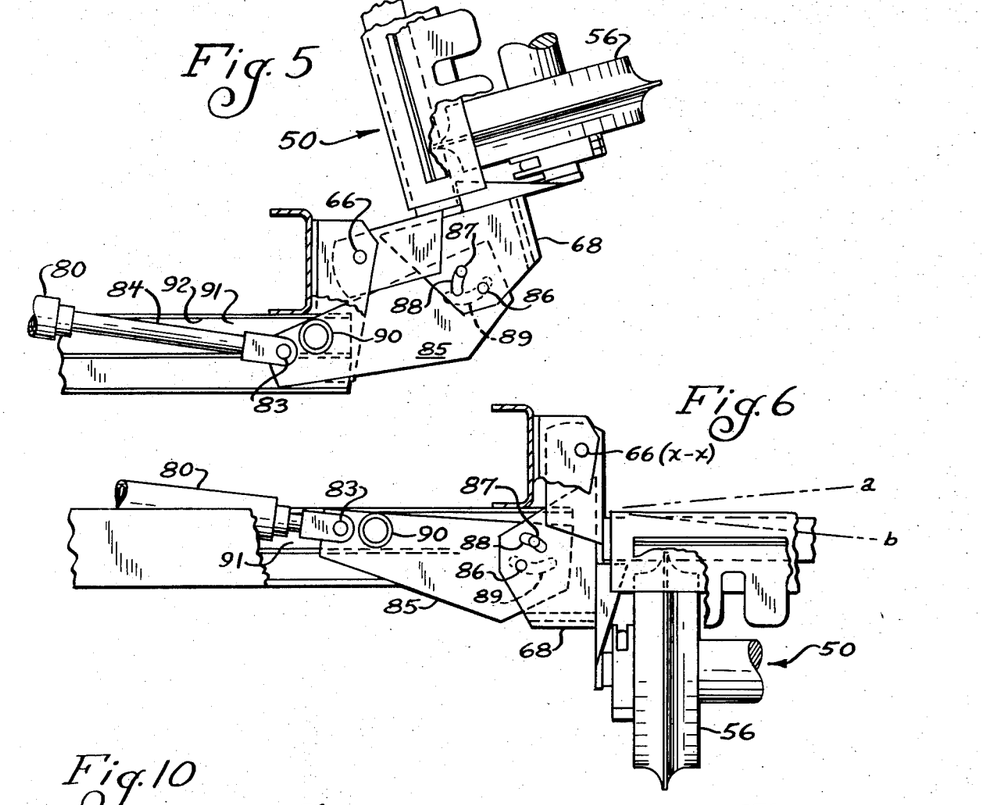
FIG. 5 is a view generally similar to FIG. 4 but illustrates the wing having been raised to where its center of gravity has passed beyond a vertical plane including its hinge axis.
FIG. 6 illustrates the wing in its extended or working position.

As illustrated by FIG. 3, with wings 50 at rest on the center channel members 24 of the main frame 20, axis $y—y$ of the operating link 85 is parallel to the vertical plane $z—z$ and close to but outside vertical plane $z—z$ and axis $x—x$ with which it is also parallel. Slot 89 generally parallels axis $y—y$. As ram 80 is actuated to move its connection at 83 inside vertical $z—z$ and past hinge axis $x—x$, pivot 90 enters cylinder guide 91 and its pull is confined to a horizontal direction by the pivot pins 90 engaging the upper wall 92 of guide 91 so that the link 85 is rocked about the inwardly shifting pivot axis which said pins 90 define. The pull force of the ram 80 on the operating link 85 is effectively transmitted to the upper edge of the slot 89 reacting on pin 86 (FIG. 4), pin 87 remaining at the wing end of slot 88 and wing 50 is caused to swing upwardly on hinge pivot pins 63,66 (axis $x—x$) until its center of gravity reaches vertical $z—z$. With continued retraction of ram 80, the center of gravity of the wing passes vertical $z—z$ and wing 50 rotates about pivot pin 87. As ram 80 pulls the pivot pin 90 further into guide 91, the weight of the wing 50 is now carried by pin 87 against which the top edge of slot 88 engages (FIG. 5). This continues until ram 80 has pulled pivot pin 90 far enough into cylinder guide 91 that the mulching rollers come to rest on the ground surface at the side of the main frame, or as close thereto as the limits of slot 89 will permit. As illustrated in FIG. 6, slot 89 in link 85 is now generally horizontal and its concave side facing the hinge axis 66. The position and angular extent of the arcs of slots 88 and 89 is selected so that when the wing 50 has been swung through 180° from its FIG. 4 to its FIG. 6 position the wing will have been located in a horizontal working position. However, the pivot pins 86 and 87 are still intermediate the ends of their respective slots wherefore the wing is free to swing within the limits defined by dash lines $a$ and $b$ unrestricted by the hydraulic ram. The wing in its field working position is thus free to follow the soil contour over which the implement is pulled by the tractor in a mulching operation.

To return the wings ot their transport or storage positions illustrated by FIG. 3, the hydraulic ram 80 is actuated in reverse and as its rod 84 is moved out of the cylinder the force thereof on pivotal connection 83 causes pin 87 to move along slot 88 until it engages the wing end thereof. Simultaneously, pin 86 is caught by the ram end of slot 89. As the wing rises upwardly about the hinge axis $x—x$, link 85 rotates about pivot pin 87 and pin 86 moves to the opposite end of slot 89 locking from further movement as the wing's center of gravity crosses vertical plane $z—z$ containing the hinge axis $x—x$, the weight of the wings being now carried by pin 86 until the wing is brought to its at rest position on the main frame. Thus, in either direction of swing of the wings 50 the wings remain under the control of their respective operating hydraulic rams. Furthermore, the swing of the wings can be operated by controls within the tractor cab as can also the controls for hydraulic rams 36 which raise and lower the implement main frame and set its spring teeth 30 and 59.

As illustrated by FIG. 3, the hinge axis $x—x$ defined by hinge pivot pins 63,66 is well below the rest position of the wings 50 on the main frame. Moreover axis $y—y$ of the operating link 85 is vertically disposed so that pivot pins 86 and 87 are in the wing end of their respective slots 89 and 88 where they effectively restrict vertical and horizontal movement of the wing to provide a very stable position for the wings 50 on the main frame without the need for locking pins or latches.

In one construction of the invention, with the wings resting on the main frame as illustrated in FIG. 3 and pins 86 and 87 in the wing end of their respective slots 89 and 88, a stable position for the wing frame was obtained when pivot pin 87 was centered on a radius $c$ which intersected the hinge axis $x—x$ at about 23° from vertical plane $z—z$ and pin 86 was centered on a radius $d$ which intersected the hinge axis $x—x$ at about 28° from said vertical plane $z—z$. In this exemplary construction, the required movement of the two pivot pins 86,87 in their respective slots during the raising and lowering of the wing and to follow the soil contour when in their extended or field working positions was found to be sufficient when the angular extent of slot 88 about pin 86 was approximately 37°, that is sufficient to allow pin 87 to move far enough to be recentered on radius e intersecting hinge axis x—x at an angle about 33° from vertical z—z and when the angular extent of arcuate slot 89 about pivot pin 87 was sufficient to allow pivot pin 86 to swing therein through an arc of about 85°.

Figure 11:
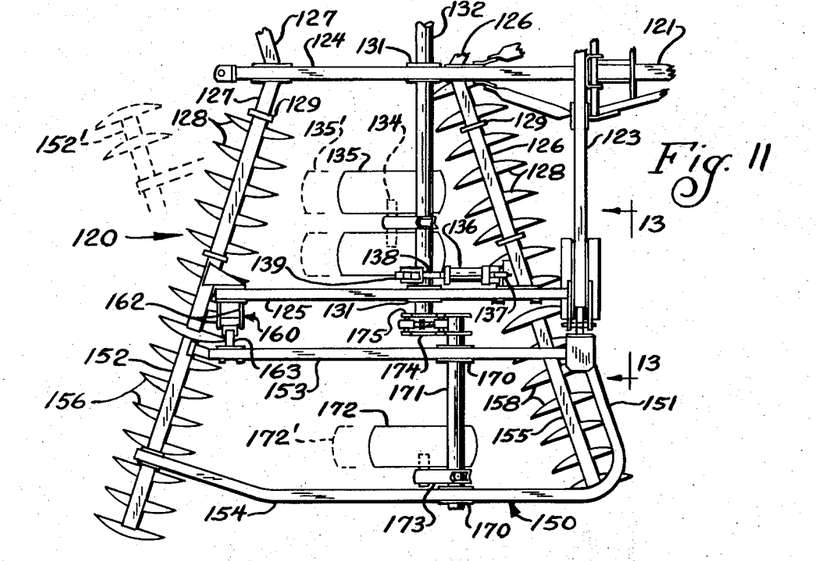
FIG. 11 is a fragmented top plan view of a second form of agricultural implement constructed in accordance with the invention, one of its wings being shown and in its extended field working position.

Referring now to FIGS. 11 through 15, the invention is illustrated embodied in a second agricultural implement known in the trade as a disk. Such a disk as illustrated in FIG. 11 comprises a main frame 120 having a pair of wings hinged to opposed sides thereof and adapted to be raised and lowered between a storage position on the main frame 120 and extended positions to either side thereof by means of a hydraulic actuated articulate linkage as described in connection with the embodiment of FIGS. 1–10. As illustrated by FIG. 11, main frame 120 consists of a forward laterally extended channel member 123, a longitudinal extending center channel member 124, a pair of outer side channel members 125 spaced on opposite sides of the center channel member and generally parallel thereto (the second side channel member and its wing structure hinged thereto being omitted from the drawing as being unnecessary to an understanding of a description of the invention) a pair of forwardly diverging channel members 126 and a pair of rearwardly diverging channel members 127, said members being rigidly welded or bolted together to form a unitized strong rigid frame structure. At 121 is a conventional hitch member by which the disk may be hitched behind a pulling tractor not shown. Suspended from diverging channel members 126 and 127 are spaced cutting disks or blades 128 rotatably supported on spaced hangers or standards 128 of conventional construction. Said side 125 and center channel members 124 have bearings 131 rigidly mounted to their undersides intermediate the front and rear diverging channel members 126 and 127 which provide rotatable support for wheel pivot shaft 132. Welded to said pivot shaft 132 on either side of center channel member 125 are a pair of wheel supporting arms 133, each said arms 133 rotatably supporting a pair of opposed spindle hub assemblies 134 to which rubber-tired wheels 135 are bolted. At 136 is a hydraulic ram having its cylinder end pivotally connected at 137 to a bracket rigidly fastened to the forward diverging channel members 126 adjacent their junction with side channel member 125. Reciprocating rod 138 of said ram has its clevis end pivotally connected to an operating arm 139 rigidly welded to the wheel pivot shaft 132. Suitable hosing (not shown) connects said hydraulic ram cylinder 136 to the hydraulic system of a tractor to which the disk is hitched. Hydraulic ram 136 may therefore be actuated so as to turn with pivot shaft 132 in one direction which will raise wheels 135 to their phantom position 135' so as to lower the blades 128 into soil working position. In this embodiment of the invention, the depth at which the blades 128 are capable of penetrating the soil is a function of the angle through which the wheels 135 are tilted by the turning of wheel pivot shaft 132.

Figures 13, 15:
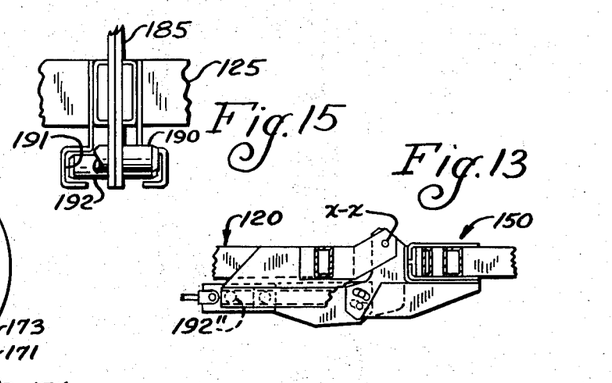
FIG. 13 is a fragmented view taken along line 13—13 of FIG. 11 and illustrates the wing raising and lowering linkage.
FIG. 15 is a fragmented end view taken from the position illustrated by line 15—15 of FIG. 14 and illustrates the sliding pivots of said articulate wing raising linkage and the receiving cylinder guide therefor.
Figure 14:
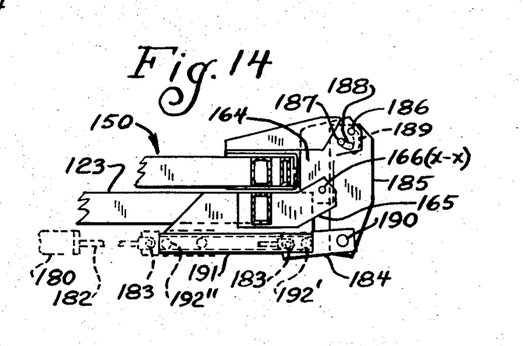
FIG. 14 is a view similar to FIG. 13 but shows the wing raising link with the wing in its storage position on the implement center frame.

Each of the wing frames 150 as illustrated in FIG. 11 comprises a rear channel member 152, an inner side channel member 153 and an outer side channel member 154, the forward end of which is bent to comprise a forward channel portion 151; these members being welded or bolted together into a unitized strong structure. As illustrated by FIG. 11, rear channel member 152 provides rotatable support for a gang of disc blades and is so disposed and angled that when the wing frame is in its extended working position as illustrated by FIG. 11, blades 156 line up with the blades 128 supported by member 127 of the main frame. At the forward end of the wing a forwardly angled gang of spaced disc blades 155 are suspended from a forwardly angled supporting channel member 155 welded or otherwise rigidly secured to inner and outer side channel members 153 and 154 and also so angled that with the wing frame in its extended working position disc blades 158 are supported in alignment with the blades 128 of member 126. Still referring to FIG. 11, each wing frame 150 is hinged to an adjacent side member 125 of the implement main frame by a hinge 160 corresponding to forward hinge 60 of the first described embodiment and a second hinge 161 corresponding to rear hinge 61 of the first described embodiment of the invention. Thus, the first hinge 160 comprises a pair of spaced ears 162 which are bolted to the outer side of the main frame side channel member 125 and straddle a hinge plate 163 bolted to the inner side channel member 153 of the wing, said hinge ears 162 being pivotally connected to said hinge plate 164 by a hinge pivot pin 164 defining a hinge axis x—x, which in this embodiment as illustrated by FIGS. 13 and 14 is substantially at the level of the main frame 120. Second hinge 161 similarly comprises a pair of spaced hinge plates 165 bolted to side channel member 125 of the main frame and hinged by a second pivot pin 166 to a pair of spaced hinge ears 168 rigidly welded to side channel member 153 of the wing 150. At 185 is an operating link which is pivotally connected at its upper end between hinge ears 164, 164 by a pair of spaced pivot pins 186 and 187. Pivot pin 186 is rigidly mounted to the hinge ears 164 and slides in an arcuate link slot 189 whose radius is centered on pin 187. Pin 187, in turn, is fixed to the operating link 185 and slides in a pair of aligned slots 188 whose radius is centered on pivot pin 186. Pins 186, 187 and their cooperating slots 188, 189 are arranged and function similarly to their counterparts 86, 87, 88 and 89 in the first described embodiment. In this particular embodiment, however, the lower end of the operating link 185 is not directly connected to the clevis end 183 of its operating hydraulic ram as was operating link 85. Instead it is connected thereat through the intermediary link 184 which in turn is connected to the lower end of operating link 185 by a barrel pivot member 190. Intermediate link 184 also includes a second pivot member 192 intermediate its connections at 190 to link 185 and to the rod 184 of its operating hydraulic ram 180. In this embodiment the hydraulic cylinder 180 is hinged or pivotally connected to a bracket (not shown) carried by side channel member 123 behind a horizontal guide 191 through which its reciprocating rod 182 reaches to connect at 183 with intermediate link 184. As illustrated by phantom lines in FIG. 14 guide 191 is of a length such that at both limits of reciprocation of rod 182 guide pin 192 on intermediate link 184 remains within the confines of the cylinder guide 191, the forward extreme position of the guide pin 192 with the wing 150 at rest on the main frame 120 being illustrated at 192' in FIG. 14 and its rearmost position when the wing 150 is in its extended position to the side of the main frame being indicated at 192''. Therefore, as rod 182 is retracted into the cylinder of ram 180 pivot pin 190 is aligned with and enters guide 191, the operation of link to raise the wing 150 off its storage position on the main frame 120 and lower it to its working position to the side of main frame 120 and reverse in cooperation pivot pins 186, 187 and arcuate slots 188 and 189 otherwise performing as previously described in connection with the first embodiment of the invention as described in connection with FIGS. 3 through 6.

Figure 12:
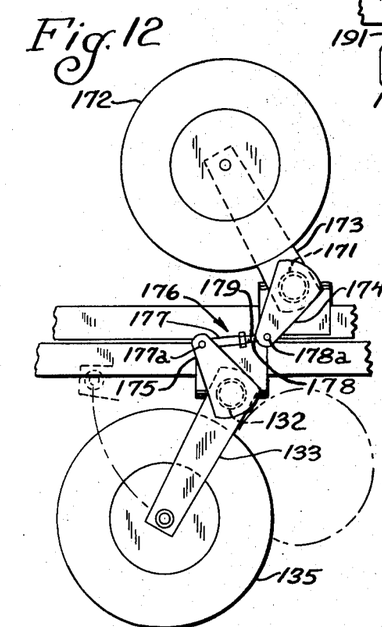
FIG. 12 is a side view of the implement of FIG. 11 with its wing at rest on the center frame and illustrates the linkage which operatively connects the wheel pivot shaft of the main frame to the wheel pivot shaft of the wing.

Considering now FIG. 12 with FIG. 11, hydraulic ram operated swivel linkage means are also employed in this embodiment of the invention so that the cutting blades 156, 158 on the wing frame 150 can be set at the same soil penetrating depth as are the blades 128 of the main frame. For this purpose, the inner side channel member 153 and outer side channel member 154 of the wing frames each have rigidly mounted bearings 170 which provide rotatable support for a wing wheel pivot shaft 171, a single rubber-tired wheel corresponding in size to wheels 135 being rotatably supported on an arm 173 rigidly welded to said wheel pivot shaft 171. As illustrated in FIG. 11, wheel pivot shaft 171 of each wing extends beyond the side channel members 153 of the wing and has an operating arm 174 non-rotatably fixed thereto. Similarly, wheel pivot shaft 132 of the main frame has an operating arm 175 non-rotatably mounted to it. The adjacent free ends of said operating arms 174, 175 are jointed by a swivel link 176 (FIG. 12) comprising a first swivel part 177 which is pivotally connected to operating link 175 at 178 and a second part 179 which is pivotally connected to operating arm 174, the two parts 177 and 178 being connected together by a screw threaded connection indicated generally at 179. As illustrated in FIGS. 12 and 11, said screw threaded swivel link 176 is disposed essentially on the hinge axis x-x about which the wing frame 150 swings. It will thus be apparent that when wheel pivot shaft 132 of the main frame is rotated in one direction by its operating ram 136, the described linkages comprising arms 174, 175 and swivel link 176 will cause wing wheel pivot shaft 171 to be turned by the same amount. The length of swivel link 176 may be adjusted to properly locate pivotal connections 177a and 178a. Also by reason of the location of swivel link 176 on or at hinge axis x—x, it does not bind or interfere with the free swinging of the wing frame 150 under the push-pull action of the hydraulic ram 180.

From the above description of two preferred embodiments of the invention, it will be apparent that all the objects, advantages and features recited for the invention have been demonstrated as obtainable in a highly practical manner.

Furthermore it will be appreciated that although the invention has been described with particular application to a mulcher and a disk it is generally applicable to all types of agricultural implements which are benefitted by having one or more wings for extending the working width thereof. It also will be appreciated that many other variations and/or rearrangements of the parts of described embodiments of the invention may be had and are intended to be included within the scope of the invention as it is defined by the hereto appended claims consistent with the prior art.

Having described my invention, I claim:

1. An angricultural implement comprising in combination, a main frame which may be hitched behind a tractor, said frame supporting a gang of soil working tools on its underside, means for setting said tools at a soil working depth including a pivot shaft rotatably mounted on said frame, and hydraulic means for rotating said pivot shaft, a wing frame hingedly connected to said frame to swing between a storage position over the main frame and a working position extended to one side of said main frame, said wing frame supporting soil working tools on its underside and a shaft means rotatably supported on said wing frame to set the wing supported tools at a working depth, said shaft means of the wing and pivot shaft of the main frame being disposed in parallel relation and at right angles to an axis on which the wing swings about its hinge connection to the main frame, and articulate linkage means interconnecting said main frame pivot shaft to the wing rotatable shaft means including a screw threaded swivel link at said hinge axis through which the hydraulic means sets the wing tools as it sets the main frame tools, said wing frame being hingedly connected to said frame by hinge connection means which includes a hinge element fixed at one end to an outer side of the wing frame and pivotally connected to means fixed to an outer side of the main frame to swing on a horizontal hinge axis disposed intermediate the transport and field working positions to which the wing is swung about its said hinge axis, an operating link pivotally connected a one end to said hinge element outward of and above said hinge axis when the wing is in its storage position, hydraulic push-pull means mounted on the main frame inwardly of a vertical including said hinge axis, said push-pull means being pivotally connected to the operating link at a distance remote from its connection to the hinge element and below said hinge axis, a pivot element on said operating link intermediate said pivotal connections of the link to said push-pull means and hinge element, and a transversely extending guide track on said main frame along which said pivot element of the operating link slides with actuation of said push-pull means to effect swinging of said wing between its storage and working position.

2. An agricultural implement as claimed in claim 1 wherein the pivot shaft of the main frame also supports wheel means radially spaced from the axis on which said pivot shaft rotates, the wheel means swinging on the axis of said pivot shaft as it rotates to lower the frame and its wing as the wing and main frame supported tools are set at their working depth by operation of the hydraulic means.

3. An agricultrual implement as claimed in claim 1 wherein said pivot shaft of the main frame supports first wheel means radially spaced from the axis on which said pivot shaft rotates, the shaft means of the wing frame supporting second wheel means similarly radially spaced from the axis on which said shaft means rotates, the working depth of the main frame and wing tools being set by the angle through which said first and second wheel means are rotated.

4. An agricultural implement according to claim 1 wherein the pivotal connection of the operating link to the hinge element comprises a first pivot pin fixed to a portion of the hinge element spaced from the hinge axis, a second pin fixed to a portion of the operating link spaced from its connection to the push-pull means, each said hinge element and operating link having an arcuate slot which slidably receives the pivot pin of the other and is centered on its pivot pin, the disposition and angular extent of said slots and relationship of said pivot pins to the hinge axis being such that the force of the push-pull means is transferred through the operating link to effect swing of the wing between its storage and working positions.

5. An agricultural implement according to claim 4 wherein the wing is free to swing when in its working position to follow the contour of the ground on which the main frame moves.

6. An agricultural implement according to claim 4 wherein the slot in the link pulls on the pin of the hinge element to raise the wing out of its horizontal rest position and the pin in the slot of the hinge element serves to resist swinging of the wing on the link as the center of gravity of the wing is moved past a vertical through the hinge axis such that movement of the wing about the hinge axis between its storage position and working position remains under the contorl of the push-pull means.

7. In an agricultural implement having a main frame which is moved across the ground and a wing hinged to one side thereof for swinging between a horizontal storage position over the main frame and a working position where it extends horizontally outwardly from the side of said frame, the improvement wherein the wing is fixed at an angle to one end of a hinge element pivotally connected to the frame to swing on a fixed horizontal axis disposed at a height intermediate said two horizontal positions of the wing, an operating link, first pivot means securing said link to said one end of said hinge element outward of and above the horizontal axis of said pivotal connection of the hinge element to the main frame when the wing is in its storage position, push-pull means mounted on said frame inwardly of said pivotal connection, second pivot means securing said push-pull means to the operating link at a distance remote from said first pivot means and below the fixed horizontal axis of said pivotal connection, a pivotal element on said operating link intermediate said first and second pivot means, and a transversely extending guide track on said main frame along which said pivotal element of the operating link slides with actuation of said push-pull means to effect swinging of said wing between its storage and working positions.

8. An agricultural implement having a main frame which moves across the ground, a wing hinged to one side of the main frame so as to be swingable between a horizontal position at rest atop the frame and a horizontal working position where it extends outwardly from said side of the main frame, and operating means therefor including push-pull means mounted on the main frame having its effective force directed generally transversely of and below the hinge axis on which the wing swings when energized, and operating link having one end pivotally secured to said push-pull means to receive said force and means connecting a portion of the link remote from said one end to the wing to transfer said force, said connecting means comprising a first pivot pin fixed to a portion of the wing spaced from the hinge axis, a second pivot pin fixed to a portion of the operating link spaced from its connection to the push-pull means, each said portions of the wing and operating link having an arcuate slot which slidably receives the pivot pin of the other portion and is centered on its pivot pin, the disposition and angular extent of said slots and relation of said povot pins to the hinge axis being such that the force of the push-pull means is transferred through the operating link to effect controlled swing of the wing between its at rest and working positions.

9. An agricultural implement as claimed in claim 8 wherein the operating link is so disposed when the wing is in its working position that the arcuate slots are generally horizontal, said slots having an angular extent accommodating swing of the wing about the hinge axis to follow slope contour varying from horizontal when in its working position.

10. An Agricultural implement as claimed in claim 9 wherein when the wing is in its at rest position on the main frame the operating link is so disposed that its slot is generally vertical and the pivot pins are in the upper reaches of said slots to resist horizontal and vertical movement of the wing.

11. An agricultural implement having a main frame which moves across the ground, a wing which is hinged to one side of the frame so as to be swingable between a horizontal at rest position atop the main frame and a horizontal working position extending outwardly from the side of said main frame, and operating means to effect said swinging including push-pull means mounted on the frame which when energized direct a force across and below the hinge axis on which the wing is swingable, an operating link pivotally connected to said push-pull means below the hinge axis to receive said force, a portion of the wing remote from said hinge axis and a portion of the operating link remote from said connection to the push-pull means each having a convex-concave shaped arcuate slot and a pivot pin slidably received in the arcuate slot of the other portion such that the force of the push-pull means is transmitted through the operating link to swing the wing on said hinge axis between its at rest and working positions, the slot in said portion of the link which receives the wing portion pivot pin extending in a direction generally axially of the link and with its concave side facing and centered on the pivot pin of said link portion, the slot of the wing portion being disposed between the pivot pin of the link portion and the hinge axis and having its convex side facing the hinge axis, the arcuate extent of said slot in the wing portion being such that a radial bisector thereof centered on the pivot pin of the wing portion in the slot of the link portion also passes through the hinge axis, the pin of the wing portion engaging against the upper end of the link portion slot and the pin of the link portion in the wing portion slot being disposed to the wing side of said radial bisector when the wing is in its horizontal at rest position so as to stabilize the wing and inhibit swinging thereof on said hinge axis when the push-pull means is deenergized.

12. An agricultural implement according to claim 11 wherein the slot in the link pulls on the pin of the wing portion to raise the wing out of its horizontal rest position and the pin in the slot of the wing portion serves to resist swinging of the wing on the link as the center of gravity of the wing is moved past a vertical containing the hinge axis so that movement of the wing about the hinge axis from its rest position to its working position remains under the control of the push-pull means.

13. An agricultural implement according to claim 11 wherein the operating link is disposed generally vertical when the wing is in its at rest horizontal position such that the wing portion pin is in the upper reaches of the slot in said portion of the operating link to resist movement of the wing about the hinge axis.

14. An agricultural implement according to claim 11 wherein the operating link is disposed generally horizontal when the wing is in its horizontal extended work position, the pivot pins being disposed intermediate the ends of their respective receiving slots to accommodate swinging of the wing about the hinge axis to follow the contour of the ground over which the main frame moves.

15. An agricultural implement having a main frame which moves across the ground, a wing connected to one side of the main frame so as to be swingable on a horizontal hinge axis between a horizontal position at rest atop the frame and a horizontal working position in which the wing extends outwardly from said side of the main frame, and operating means therefor including push-pull means mounted on the main frame inwardly of and below the hinge axis, an operating link having one end pivotally secured to said push-pull means below said hinge axis and means connecting an opposite end portion of the link to an outwardly extending hinge plate portion of the wing to transfer said force, said connecting means comprising a first pivot pin fixed to said hinge plate portion of the wing at a location spaced outwardly from and above the hinge axis when the wing is in its at rest position atop the main frame, a second pivot pin fixed to said opposite end portion of the operating link at a location spaced from its connection to the push-pull means, each said portions of the wing and operating link having a concave-shaped slot which slidably receives the pivot pin of the other portion and is centered on the pivot pin of said other portion, a sliding pivotal element disposed on said link below the hinge axis and adjacent the pivotal connection of the push-pull means to the operating link and link, horizontally disposed guide track on the main frame which slidingly receives said pivotal element with actuation of said push-pull means to support the wing as it is swung between its at rest position and working position in response to actuation of the push-pull means, the concave-shaped slot in said opposite end portion of the operating link extending generally in the direction of the longitudinal axis of the operating link with its concave shape facing the hinge axis, the concave-shaped slot in the wing hinge plate portion being disposed between the first pivot pin and the hinge axis with its concave shape facing away from the hinge axis, the operatink link being disposed vertically when the wing is in its at rest position atop the main frame and horizontally when the pivotal element is withdrawn into the guide track below the main frame far enough to locate the wing in its generally horizontal extended working position outwardly of the main frame, the angular extent and disposition of said slots in the wing hinge plate portion and opposite end portion of the operating link being so related that the pivot pins are in the upper reaches of the respective receiving slots when the wing is atop the main frame to inhibit swinging of the wing on said hinge axis, said pivot pins being disposed intermediate the reaches of the respective receiving slots of said wing hinge plate portion and opposite end portion of the operating link when the wing is in its horizontal extended working position so as to accommodate swing of the wing about the hinge axis to follow the ground contour over which the implement is moved.

* * * * *

PO-1050
(5/69)

UNITED STATES PATENT OFFICE
CERTIFICATE OF CORRECTION

Patent No. 3,828,860      Dated August 13, 1974

Inventor(s) ROBERT L. POLAND

It is certified that error appears in the above-identified patent and that said Letters Patent are hereby corrected as shown below:

Column 12, line 26 reads "pivotally connected
                                a one end"

Should read:   --pivotally connected at one
                                 end--

Column 16, lines 1 and 2 read: "to the operating link
                                        and link, horizontally"

Should read:   --to the operating link, and a
                                 horizontally--

Column 16, line 14 reads:  "operatink"

Should read:   --operating--

Signed and sealed this 29th day of October 1974.

(SEAL)
Attest:

McCOY M. GIBSON JR.              C. MARSHALL DANN
Attesting Officer                 Commissioner of Patents

PO-1050
(5/69)

UNITED STATES PATENT OFFICE
CERTIFICATE OF CORRECTION

Patent No. 3,828,860          Dated August 13, 1974

Inventor(s) Robert L. Poland

It is certified that error appears in the above-identified patent and that said Letters Patent are hereby corrected as shown below:

As shown: Assignee: Kewanne Machinery & Conveyor Co., A Division of Chromalloy American Corporation, Kewannee, Ill.

Should be:
Assignee: Kewanee Machinery & Conveyor Co., A Division of Chromalloy American Corporation, Kewanee, Ill.

Signed and sealed this 4th day of February 1975.

(SEAL)
Attest:

McCOY M. GIBSON JR.
Attesting Officer

C. MARSHALL DANN
Commissioner of Patents